US006772108B1

(12) United States Patent
Stolowitz

(10) Patent No.: US 6,772,108 B1
(45) Date of Patent: Aug. 3, 2004

(54) RAID CONTROLLER SYSTEM AND METHOD WITH ATA EMULATION HOST INTERFACE

(75) Inventor: Michael C. Stolowitz, Danville, CA (US)

(73) Assignee: NetCell Corp., San Jose, CA (US)

(*) Notice: Subject to any disclaimer, the term of this patent is extended or adjusted under 35 U.S.C. 154(b) by 373 days.

(21) Appl. No.: 09/667,965

(22) Filed: Sep. 21, 2000

Related U.S. Application Data
(60) Provisional application No. 60/156,001, filed on Sep. 22, 1999.

(51) Int. Cl.[7] .............................................. G06F 9/455
(52) U.S. Cl. ............................ 703/27; 703/24; 703/25
(58) Field of Search .............................. 703/24, 25, 27

(56) References Cited

U.S. PATENT DOCUMENTS

| | | | |
|---|---|---|---|
| 4,514,823 A | 4/1985 | Mendelson et al. | 364/900 |
| 5,003,558 A | 3/1991 | Gregg | 375/108 |
| 5,038,320 A | 8/1991 | Heath et al. | 364/900 |
| 5,151,977 A | 9/1992 | Fredericks et al. | 395/200 |
| 5,185,862 A | 2/1993 | Casper et al. | 395/250 |
| 5,268,592 A | 12/1993 | Bellamy et al. | 307/43 |
| 5,392,425 A | 2/1995 | Elliott et al. | 395/575 |
| 5,428,649 A | 6/1995 | Cecchi | 375/372 |
| 5,471,581 A | 11/1995 | Munier et al. | 395/250 |
| 5,491,804 A | 2/1996 | Heath et al. | 395/275 |
| 5,581,715 A | 12/1996 | Verinsky et al. | 395/309 |
| 5,740,397 A * | 4/1998 | Levy | 711/114 |
| 5,771,372 A | 6/1998 | Pham et al. | 395/551 |
| 5,794,063 A | 8/1998 | Favor | 395/800.23 |
| 5,805,921 A * | 9/1998 | Kikinis et al. | 710/2 |
| 5,890,014 A | 3/1999 | Long | 395/828 |
| 5,964,866 A | 10/1999 | Durham et al. | 712/200 |
| 5,974,544 A * | 10/1999 | Jeffries et al. | 713/1 |
| 6,018,778 A | 1/2000 | Stolowitz | 710/61 |
| 6,098,114 A * | 8/2000 | McDonald et al. | 710/5 |

OTHER PUBLICATIONS

EDN Access; for Design, by Design: "Embedded Systems," Jan. 18, 1996, published on the Internet by *EDN Magazine* at <http://www.e-insite.net/ednmag/archives/1996/011896/02prod4.htm>.

EDN Access; for Design by Design: "Easy-to-Use Flash-Memory Modules Emulate Disk Drives," Sep. 1, 1994, by Gary Legg. Published on the Internet by *EDN Magazine* at <http://www.e-insite.net/ednmag/archives/1994/090194/18df2.htm>.

Silicon Valley Computer advertisement dated Jan. 21, 1994, by Norm Towson.

"Silicon Valley Computer, IDE Mirror Card, Model ADP104/ADP108," User Manual, Part No. 113, Copyright 1992 by Silicon Valley Computer, (Cover page, table of contents, introduction, and pp. 8–16.)

(List continued on next page.)

*Primary Examiner*—Kevin J. Teska
*Assistant Examiner*—Dwin M. Craig
(74) *Attorney, Agent, or Firm*—Stoel Rives LLP

(57) ABSTRACT

A RAID storage device controller provides a host interface for interfacing the controller to a host system bus. The host interface is isolated from the attached storage devices, for example IDE disk drives, so that the actual attached drives are not limited in number or interface protocol. Various device ports can be implemented, and various RAID strategies, e.g. level 3 and level 5, can be used. In all the cases, the host interface provides a standard, uniform interface to the host, namely an ATA interface, and preferably a dual channel ATA interface. The host interface emulates the ATA single or dual channel interface and emulates one or two attached IDE devices per channel, regardless of the actual number of devices physically connected to the controller. Thus, for example, five or seven IDE drives can be deployed in RAID level 5 protocol without changing the standard BIOS in a PCI host machine. Thus the RAID controller is transparent relative to a standard dual channel ATA controller board.

11 Claims, 5 Drawing Sheets

OTHER PUBLICATIONS

Sven Schulz, "Elegant Pair Skating," Promise FastTrak, EIDE RAID Adapter, English translation of a German article (also submitted herewith) published in *C'T Magazin Für Computer Technik*, Jun. 1998, p. 116, XP002216756, Hanover Germany.

Specification entitled "PCI IDE Controller Specification" (revision 1.0, dated Mar. 4, 1994) (anonymous).

Specification entitled "Programming Interface for Bus Master IDE Controller" (revision 1.0, dated May 16, 1994), by Brad Hosler, Intel Corporation.

Jan. 5, 2001 International Search Report for international application No. PCT/US00/26343.

Jin, Hai, et al., "Improving Partial Stripe Write Performance in RAID Level 5." Proceedings of the 1998 Second IEEE International Caracas Conference on Devices, Circuits and Systems, 1998. pp. 396–400.

Sahai, Anil K., "Performance Aspects of RAID Architectures." Performance, Computing and Communications Conference, 1997. IPCCC 1997. *IEEE International.* pp. 321–327.

Zabback, P., et al., "The RAID Configuration Tool," Third International Conference on High Performance Computing, 1996. pp. 55–61.

Cheng, A.M.K, et al., "Improving the I/O Performance of Real–Time Database Systems with Multiple–Disk Storage Structures." Proceedings of the 1996 International Conference of Parallel Processing, 1996. vol. 3. pp. 204–211.

Feng, Dan, et al., "Performance Analysis of RAID for Different Communication Mechanism Between RAID Controller and String Controllers." IEEE Transactions on Magnetics. vol. 32, No. 5. Sep. 1996. pp. 3890–3892.

Menon, Jai, et al., "The Architecture of a Fault–Tolerant Cached RAID Controller." Proceedings of the $20^{th}$ Annual International Symposium on Computer Architecture. 1993. pp. 76–86.

* cited by examiner

RAID CONTROLLER SYSTEM AND METHOD WITH ATA EMULATION HOST INTERFACE

RELATED APPLICATIONS

This Application is a continuation and claims priority from U.S. provisional application No. 60/156,001 filed Sep. 22, 1999.

TECHNICAL FIELD

The invention pertains to computer data storage device controllers and, more specifically, pertains to a RAID controller having a host interface that emulates ATA standard controllers and attached IDE devices.

BACKGROUND OF THE INVENTION

The first IBM PC and compatibles had only floppy disk drives for mass storage. The XT and AT models that followed included adapters for the connection of 5.25 inch fixed disks (non-removable) for mass data storage. These original adapters provided most of the low-level control signals for the drives including data separation circuits for the read signals and pre-compensated write signals. Including these functions in the adapter avoided replication in a pair of drives that were accessed only one at a time. Unfortunately, the 5 M bit read/write channel on the adapter did not allow faster drives to be attached as the technologies improved.

Moving the "real time" aspects of the controller into the drive solved this problem. The Integrated Drive Electronics or IDE drive incorporates all of the controls and data channel necessary to read or write the drive, transferring data between a local buffer and the media. The manufacturer may choose the data rate. A new interface, the ATA (AT Attachment with Packet Interface Extension (ATA/ATAP1–4)) (IBM AT Attachment Interface) was defined for the connection of data storage devices to the host system. The first IDE interfaces consisted of little more than address decoding and buffering between the ISA Bus and the ATA cable connector. The interface protocol used programmed input and output instructions to access the registers of the IDE device. Data transfers used the host processor's input string and output string instructions throttled to the transfer rates of the attached drives. These transfer rates reached 16 Mbytes per second in the later revisions of the specification. This was the transfer rate between the buffer on the storage device and memory on the ISA Bus. The transfer rates between the media and the buffer we much lower.

With the advent of the PCI Bus, Intel published the PCI IDE document (PCI IDE Controller Specification, Revision 1.0, Mar. 16, 1994) which provided a standard mapping of the previously ISA Bus based host interface to the PCI Bus. The standard described a Dual IDE Channel Controller. A pair of devices, the Master and the Slave, could be attached to each of the channels. For data transfers, the device was still accessed as a PCI Bus Target.

Intel also published the Bus Master IDE document (Programming Interface for Bus Master IDE Controller, Revision 1.0, May 16, 1994). This document defines a standard for the incorporation of DMA devices within the IDE channels. The Bus Mastering interface allows the IDE channel to transfer data over the PCI Bus to or from system memory as a Bus Master (PCI Bus Initiator). The peak transfer rate to a 32 bit/33 MHz PCI Bus is 133 Mbytes per second.

A revision of the ATA specification defined a new transfer mode, Ultra DMA. Prior transfer rates improvements had been obtained by tightening the setup and hold time requirements for data transfers on the cable. At 16 Mbytes per second, the read transfer rate was very much limited by the round trip of sending out the read strobe, accessing the data, and sending back the data. The Ultra DMA protocol initially retained the electrical characteristics of all of the signal and cable, simply redefining the functions of three of the signals to provide a new protocol. In this protocol, the strobe signal that provides the data timing is sent from the same end as the data, i.e., by the controller for a write and by the device for read. In this configuration, the transfer rate is limited only by the cable skew for a single transition of the cable. The first UDMA devices double the programmed IO transfer rates to 33 Mbytes per second. Subsequent revisions double the initial UDMA transfer rate to 66 Mbytes per second, but required the use of an 80 conductor ribbon cable with alternating signal and ground conductors. The current version supports transfer rates of 100 Mbytes per second. There is currently a move afoot to replace the ATA Parallel interface with a high speed serial link, but it is possible that one more parallel speed increment may be released first.

The Problem

The common personal computer consists of a motherboard that is designed around a chip-set which includes a processor, a DRAM interface, various Input/Output adapters, and a BIOS ROM. The IO adapters generally include an IDE interface. Current versions of IDE controllers feature a pair of IDE ports, each capable of interfacing to a pair of IDE storage devices. These devices typically include one or more IDE hard disks plus CD ROM, DVD ROM, or CD WORM drives. The Basic Input Output System or BIOS is a program that is used to boot the PC and to provide low level IO routines for the adapters on the motherboard. Essentially all of these PC's can boot and run from an IDE hard disk using the motherboard BIOS.

Increasingly, personal computers are deployed in server or workstation applications in the Small Office/Home Office (SOHO) marketplace. Historically, hard disks with the Small Computer System Interface (SCSI) provided some performance gains for these more demanding applications. Today, however, with more than 85% of all drives being produced as IDE drives, the SCSI drives tend to be built using the same media and read/write heads with little or no performance gains and greatly increased cost. Another popular alternative is to utilize a Redundant Array Of Inexpensive Disks (RAID) as originally proposed by Patterson (D. Patterson, et al., "A Case for Redundant Arrays of Inexpensive Disks (RAID)" (Univ. Cal. Report No. UCB/CSD87/391, December 1987). RAID systems address both the reliability and the performance issues. First, reliability is obtained by storing the data redundantly over two or more drives so that no data is lost if a single drive fails. Second, increased performance is obtained relative to that of a single drive because of the aggregate performance of the array. Different sections of data stored redundantly may be read concurrently from two drives. Also, data may be written in stripes which cross all of the available drives so that the aggregate transfer rate can be realized when the data is read back. RAID array controllers are further described in the present inventor's U.S. Pat. No. 6,018,778.

Unfortunately, there are disadvantages to the several RAID solutions available. Local intelligence and the use of SCSI disk drives characterize one class of RAID solution. This class exhibits high performance albeit at very high cost for both the drives and the controller. The other popular RAID solution class is characterized by the use of IDE drives and the lack of any local intelligence or buffering. This is essentially a software solution. The software necessary to control the multitude of drives to maintain redundancy or to stripe data must all run on the host system, greatly increasing the disk drive overhead on the processor and the system bus. Thus RAID benefits are achieved at the cost of reduced system performance due to this increased overhead. Both of these solutions share an additional problem. These RAID controllers are not supported directly by the BIOS on the motherboard. Additional software drivers are required. These drivers may vary as a function of the operating system, e.g., Windows, Windows NT, UNIX, LINUX, etc resulting in an additional burden for the controller manufacturer, OEMs, marketing groups, and system integrators.

The need remains, therefore, for a RAID storage device controller that does not require special software to execute on the host processor, and does not require additional software drivers or changes to the BIOS. A RAID controller that requires no changes to the BIOS would have the advantage of "plug-and-play" compatibility with virtually all standard, off-the-shelf computers that implement an ATA compliant interface. The RAID controller would be transparent to the host, and could be used to deploy multiple storage devices (not limited to four), in any combination of device interfaces, and could implement RAID mirroring, striping, etc. without adding overhead to the host. Such a RAID controller would bring RAID capability to all PC users at low cost and with very simple installation.

SUMMARY OF THE INVENTION

The current invention implements a RAID controller that is compatible with all operating systems than can boot and run on a given PC motherboard using a standard IDE controller and IDE drive. It achieves this compatibility by emulating the standard controller and attached drive. For example, a given system might require a pair of drives in a RAID1 or "mirroring" configuration for reliability. When connected to the controller described in the current invention, the BIOS will see a single, very reliable drive. The same system might also require an array of three drives configured as either a RAID3 or RAID5 configuration. This would provide twice the transfer rate of any one of the three drives with high reliability. Once again, on the current invention, this array of three drives would appear to the BIOS as a single drive reporting twice the capacity of any one of the three drives and exhibiting twice the transfer rate with high reliability. In any case, the RAID is transparent to the existing drivers in the BIOS.

The controller of the current invention emulates the standard two-channel IDE controller. Like the standard controller, it is logically connected to the PCI Bus. It may reside either physically on the motherboard, possibly integrated within the motherboard chip-set, or on a plug-in card in a PCI slot. It may emulate all four devices that might be attached to the standard controller. Each of these logical devices provides a potential interface to an array of physical devices attached to the controller. While the current embodiment provides ATA ports for the attachment of the physical drives, other types of interfaces or combinations of interfaces might be used.

Additional objects and advantages of this invention will be apparent from the following detailed description of preferred embodiments thereof which proceeds with reference to the accompanying drawings.

DETAILED DESCRIPTION OF A PREFERRED EMBODIMENT

Figure 1:
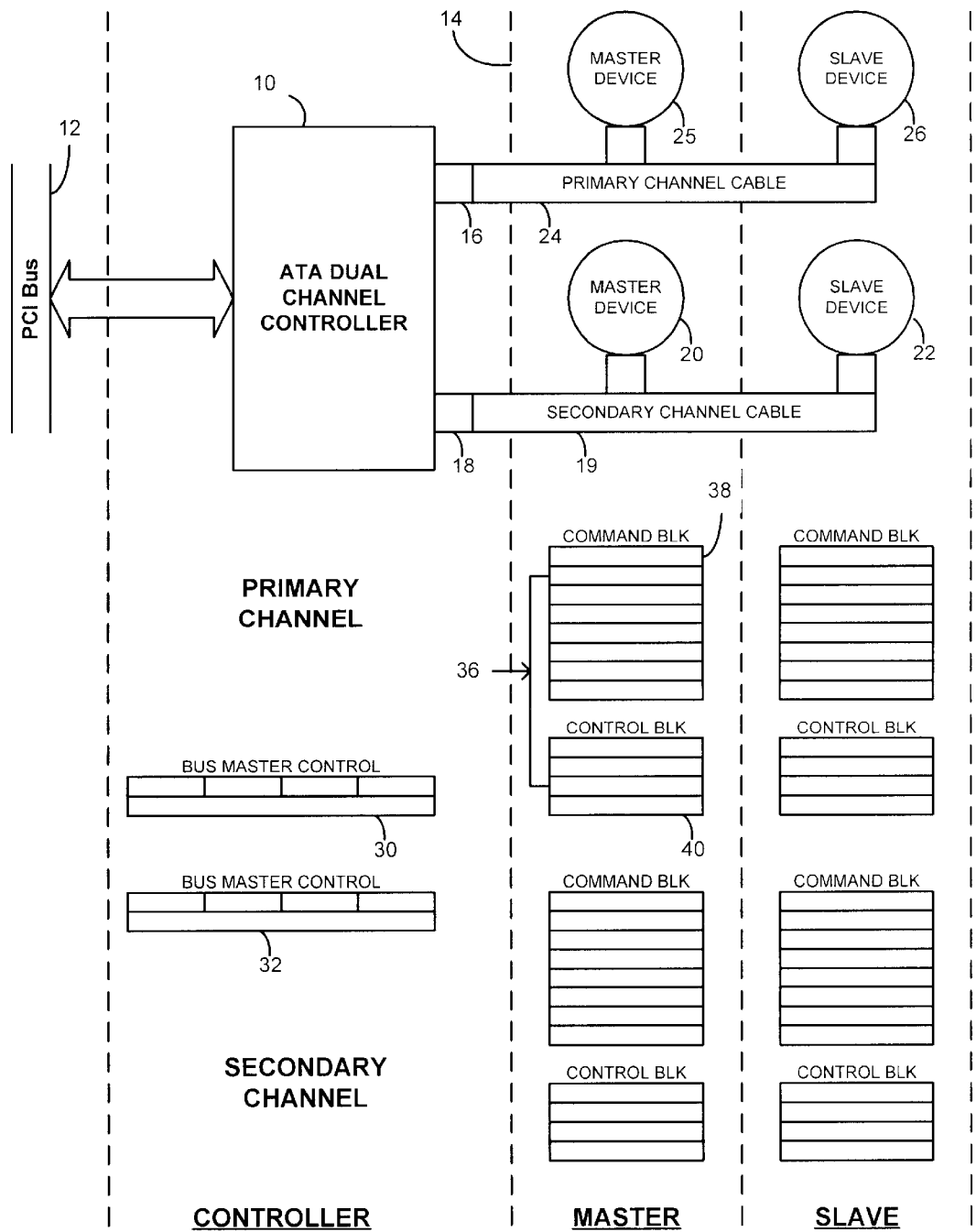
FIG. 1 is a simplified block diagram of a prior art ATA dual channel controller application showing physical and software/register views.

The upper half of FIG. 1 depicts a typical prior art application of an ATA Controller 10 in a personal computer providing an interface between the system Bus 12 and storage devices 14. The system Bus 12 is the PCI Bus. While logically attached to the PCI Bus, an ATA Controller is usually integrated within the Mother Board Chip Set. For a given application, an alternate or additional controller may be plugged into one of the PCI Bus slots on the motherboard (not shown). The PCI Bus provides a configuration mechanism through which unique addresses are assigned to each of the controllers. A typical controller 10 provides two channels that terminate in a pair of connectors 16, 18 identified as the Primary and Secondary IDE connectors. Each of the channels will support a pair of storage devices that share the connector and cable. For example, in FIG. 1, the secondary channel cable 19 is connected to a master storage device 20 and to a slave storage device 22. Another pair of drives are similarly connected to the primary channel cable 24. The two-channel controller 10 thus supports a total for four devices as shown in the FIG. 1.

The lower half of FIG. 1 shows the programming interface of the IDE Controller and drives as seen from the PCI Bus. The physical address for each of the blocks is assigned through the PCI Bus configuration space of the controller as is generally known in the industry and described in the Intel PCI IDE Controller Specification document previously cited. The other previously cited Intel document, Programming Interface for Bus Master IDE Controller, describes the programming interface for the Bus Master IDE Controller. Prior to the standardization of this mechanism, storage device data was typically transferred through programmed I/O in which the loads and stores required for data transfers were executed by system processor. While the Programmed I/O mechanism is still supported, the Bus Master Interface allows the ATA Controller to transfer data through direct accesses of system memory, i.e., DMA. The Bus Master IDE Controller document defines a sixteen byte block of registers that support a pair of Bus Master Controllers, one for the primary and one for the secondary ATA channel. This register block is physically part of the controller. It is shown split into two parts, 30 and 32, one associated with each of the channels.

The ATA Specification defines the programming interface for the storage devices. This interface consists of two register blocks: The Command block and the Control block. The Command block is an eight-byte block of byte-wide registers. The Control block is a four-byte block of byte wide registers. All of the implementation details for these registers are published in the ATA Specification.

The right side of FIG. 1 shows four sets of Command and Control register blocks, one set corresponding to each of the four attached storage devices. For example, one set of register blocks 36 consists of Command Block 38 and corresponding Control Block 40. These registers are physically part of the corresponding storage devices shown in the upper half of FIG. 1. Thus, register set 36 (primary channel) is located in master storage device 25. If a given storage device is not attached, its Command and Control register blocks will not appear in the programming interface.

The ATA Specification also defines the protocols supported by the storage devices. In general, an access command and all related parameters are loaded into registers of the Command block. The storage device will then execute the command. For a device write, it will first request the write data. For programmed I/O operation, the host processor will read the data from system memory and write it to a buffer within the device (not shown) using a portion of the Command block as a sixteen bit window into the buffer. For a Bus Master DMA operation, the ATA Controller will access the data directly from system memory based on the configuration of the Bus Master Controller register block for that channel. The storage device then accesses the storage media transferring data between the media and its local buffer. For a media read, the data in the local buffer is then transferred to the system memory using either programmed I/O or Bus Master DMA as described above. Finally, the storage device will indicate completion through the ATA Controller to the host system either through the polling of a status register or with an interrupt.

At power on, personal computers execute code that is physically stored on the motherboard in non-volatile memory. This Basic Input Output System or BIOS code, loads the personal computer's operating system from an ATA storage device attached to the ATA Controller and provides the low-level I/O system drivers for such storage devices.

Figure 2A:
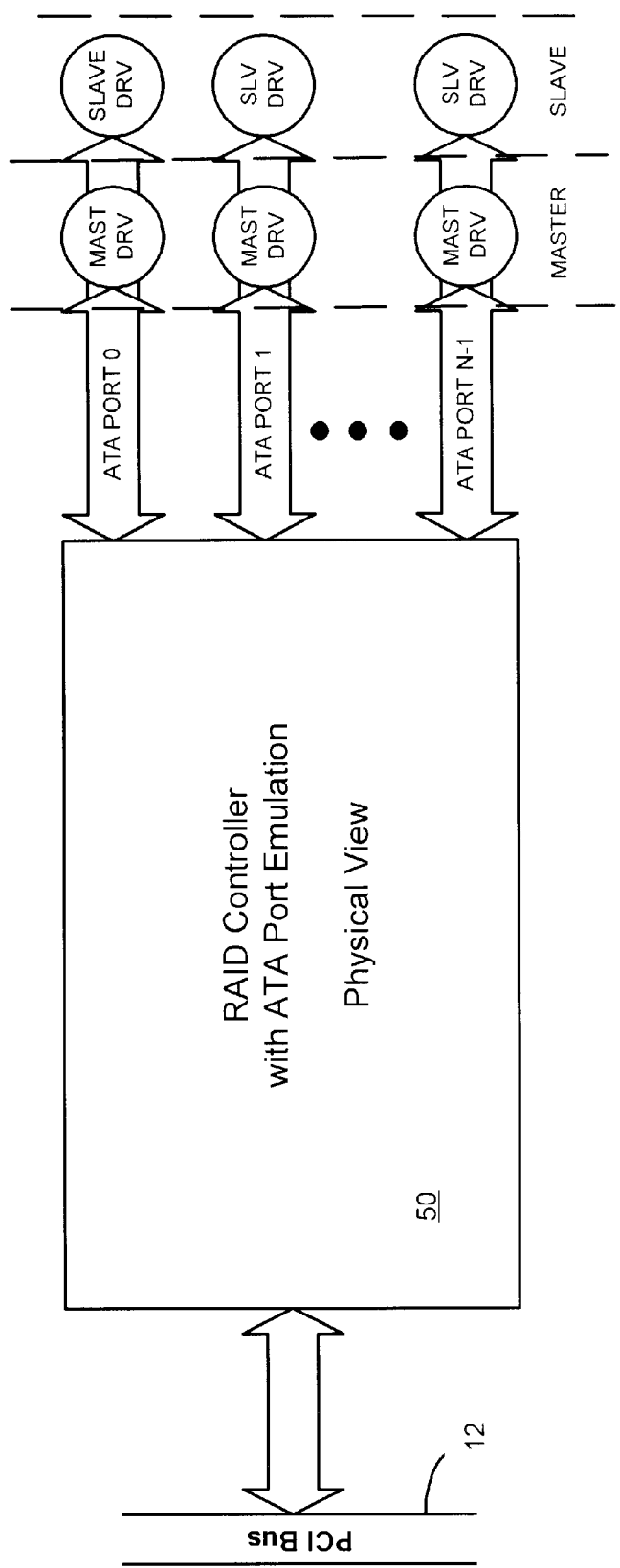
FIG. 2A is a simplified block diagram of a RAID controller with ATA port emulation according to the present invention.

The present invention emulates the ATA Controller shown in FIG. 1 and described above and is fully compatible with it at the programming level. FIG. 2A is a block diagram of a controller according to the present invention, which can be configured for example as a RAID controller. The left side of the controller block 50 attaches to the PCI Bus in place of a standard dual channel ATA Controller, and emulates from one to four attached ATA storage devices. This emulation of the ATA storage devices, to be described in more detail below, de-couples the controller's host interface from the physical device interfaces allowing considerable freedom in the types and numbers of device interfaces to be provided. For example, an application of the current invention might implement X SCSI ports and/or Y ATA ports, where X and Y are in no way restricted to the four logical drives that appear to the host system. FIG. 2A is an example implementing N+1 ATA ports, numbered 0 to N−1.

Figure 2B:
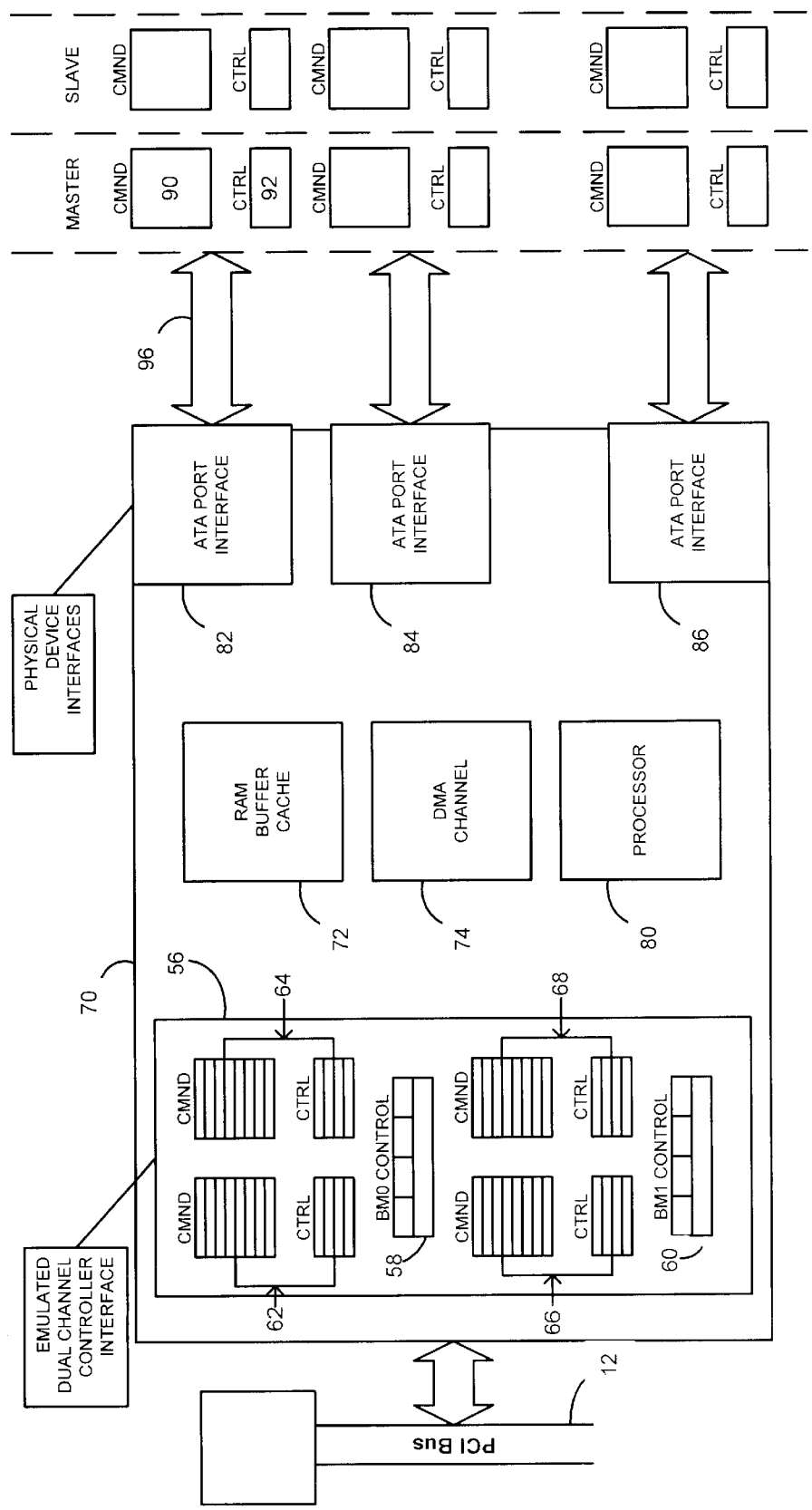
FIG. 2B depicts the programming interface of the current invention.

FIG. 2B depicts the programming interface of the current invention. The Host Interface 56 implements all of the register blocks visible from the PCI Bus of the standard ATA Controller: The Dual Channel Bus Master Controller Block 58, 60 and the four sets of Command and Control register blocks numbered 62,64,66 and 68. The Host Interface block 56 emulates the registers of the ATA Controller and ATA Storage devices to the level needed to support the ATA Specification protocols.

Block 70 in FIG. 2B illustrates the principal components of the controller block 50. In addition to the host interface block 56, the controller 70 includes a RAM buffer cache 72, a DMA channel 74, and a processor 80, as further described below. The controller block 70 further includes a plurality of ATA port interfaces, for example, interfaces 82, 84 and 86. Each ATA port interface provides a standard interface connection to an IDE type storage device, such as a disc drive. As explained previously, each storage device includes command and control register blocks on board. These are illustrated, for example, as command register block 90 and control block 92, both of which are associated with a single device, namely, the master drive, which would be connected to ATA port interface 82, the standard connector cable 96. The controller block 70 can be configured to include any desired number of ATA ports while still providing a standard dual channel controller interface 56 to the host PCI Bus 12.

Figure 3:
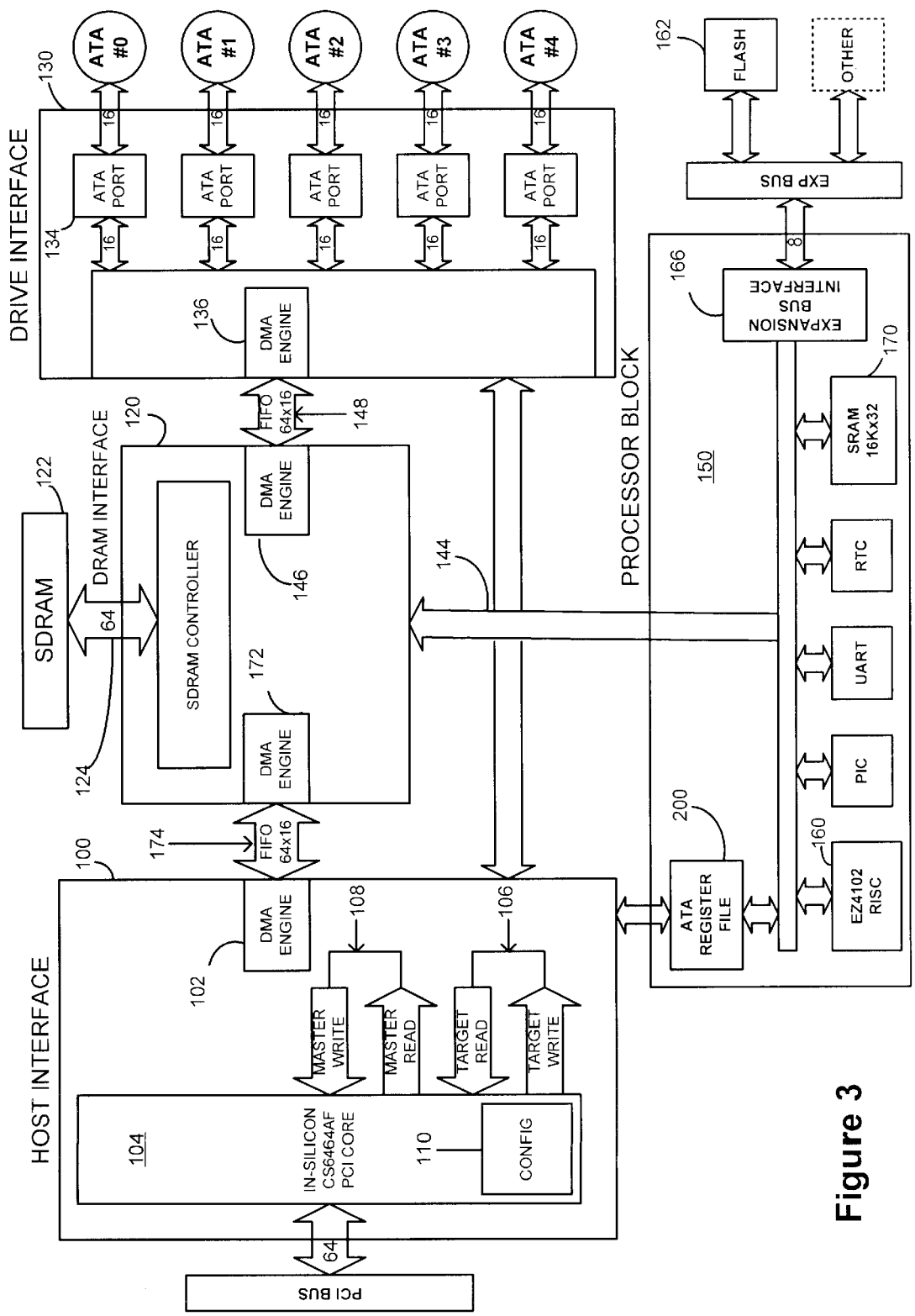
FIG. 3 is a high-level block diagram of a presently preferred commercial embodiment of a RAID controller with ATA port emulation.

A detailed block diagram of a presently preferred embodiment of the invention is shown in FIG. 3. This system is implemented as an Application Specific Integrated Circuit (ASIC) in a 0.18 micron CMOS process. The device is logically divided into four modules, each with an-associated port to the outside of the device.

The Host Interface 100 is built around a PCI Core 104 from In-Silicon. The CS6464AF is a soft-core (Verilog source synthesized for the particular application) that supports both 32 bit and 64 bit PCI Busses at 33 MHZ or 66 MHZ PCI Bus clock rates. The core supports both Master and Target operations. The Target features 106 provide access to the ATA compatible register files previously discussed. The Master capability 108 is used to Emulate the Bus Master DMA features of a ATA controller. The PCI Core includes a configuration space that emulates the configuration space 110 of a dual ported ATA controller.

The DRAM Interface block 120 supports externally connected SDRAM 122. The 64 bit wide, 100 MHZ single data rate port 124 supports peak transfer rates of 800 Mbytes per second. Locally, the DRAM interface is shared by transfers to or from the PCI Bus through the Host Interface 100, transfers to or from disk drives through the Drive Interface 130, and accesses by the Local Processor in the Processor Block 150.

The Drive Interface block 130 provides five ATA Ports, e.g., 134, each capable of supporting a Master and a Slave drive. Each port supports Programmed Input Output (PIO) at transfer rates up to 16 Mbytes per second and Ultra DMA transfers at transfer rates up to 100 Mbytes per second.

The Processor Block is built around the EZ4102 TinyRISC core 160 from LSI Logic. This processor is a variant of the MIPS processor. At power on, the processor loads code from an external FLASH memory 162 that is accessed through the Expansion Bus port 166. This code is transferred to the SRAM block 170 within the Processor Block. The processor 160 configures each of the other modules and through these modules, it may access the PCI Bus, the SDRAM, or the ATA Drives. In general, system transfer rates are enhanced by not requiring the processor to handle data. The processor orchestrates the movement of data between the Drive and the DSRAM by configuring DMA engines 136, 146 in these blocks to either load or unload the FIFO 148 between them. In the same way, it orchestrates transfers between the SDRAM and PCI Bus targets by configuring DMA engines 172, 102 in the DRAM Interface and the Host Interface to either load or unload the FIFO 174 between these blocks.

Figure 4:
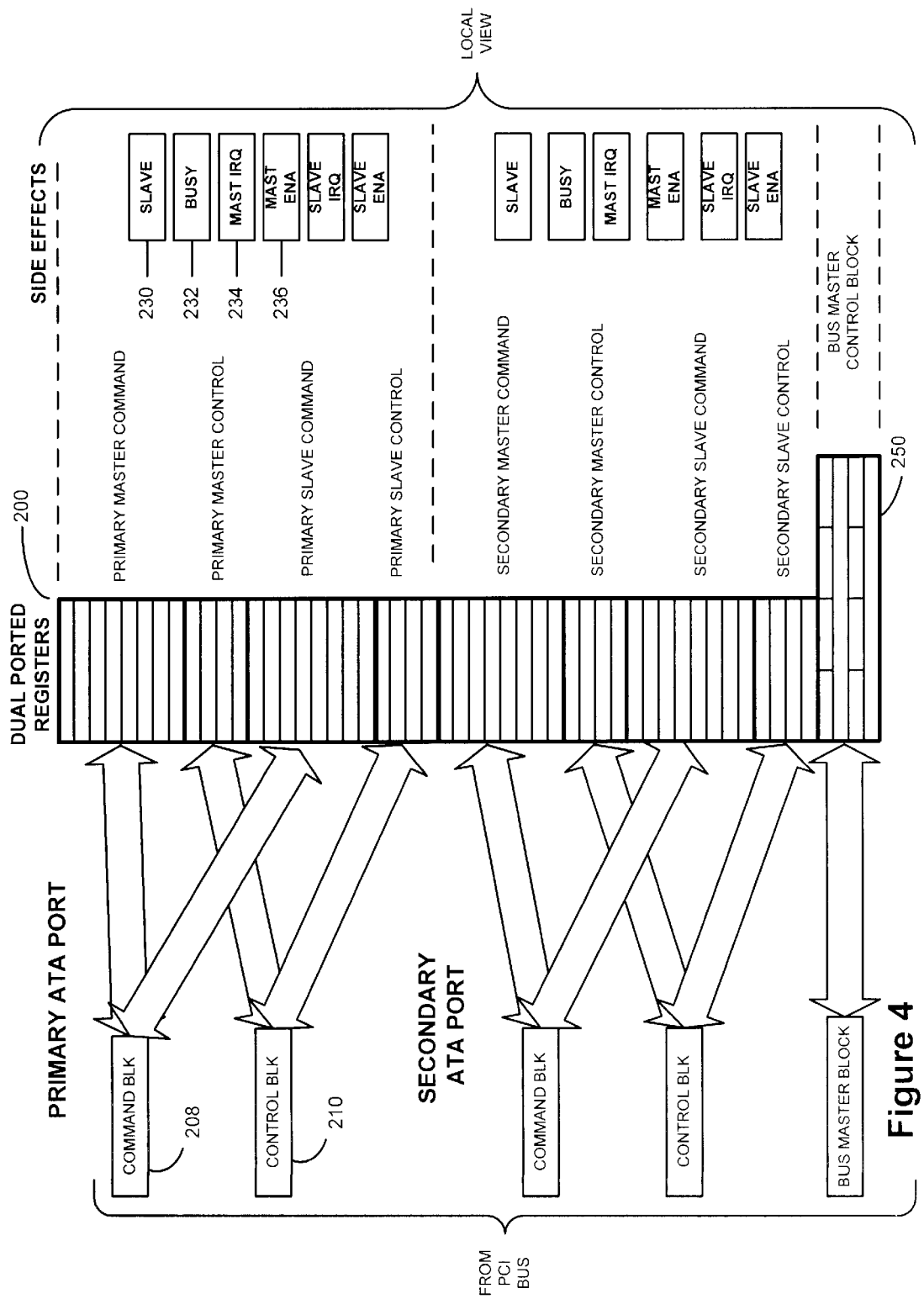
FIG. 4 shows greater detail of one implementation of the ATA register file of the controller of FIG. 3.

FIG. 4 shows the ATA Register file implementation details. The registers are all dual ported and may be accessed from the PCI Bus by the host system or by the local processor 160. As seen from the PCI Bus, each ATA channel has two blocks of registers associated with it. The Command block 208 is an eight-byte range of byte wide registers. The Control block 210 is a four-byte range in which only a single location is used. As previously described a single ATA Port may be used to access a pair of devices attached to a common cable. Each device has its own Command and Control register blocks. The devices are physically configured with jumpers to designate one as the Master and the other as the Slave. A specific device is selected for access by writing a byte of data to the Device Head register at address offset six in the command block. If bit four is asserted, the Slave device is selected and the Master is deselected for subsequent operations. If the same register is written with bit four cleared, the Master device becomes selected and the Slave will be deselect. To emulate this behavior in the current invention, both the Master and Slave register sets are implemented. In addition, single bit Slave register 230 is provided that records bit four of the most recent write to the Device Head register. The Slave register controls the read multiplexing and the write address decoding from the PCI Bus so that the appropriate pair of register blocks will be accessed based on the most recent device selection.

At power-on or following a reset, ATA devices are initially Busy. The Busy state may be detected by reading the Status register at address offset seven in the Command block or the Alternate Status register block in the Control block. While a device is Busy, none of the other register may be accessed. To emulate this behavior in the current invention, a single bit Busy register is 232 provided. This register is set by reset from the PCI Bus, by a write to the Soft Reset bit in the Device Control register of the Control block, or when the Command register is written at address offset seven of the Command register block. The Local Processor may clear the Busy register.

Each ATA Device is capable of asserting an interrupt request to the host system if interrupts have been enabled within the device. To emulate this behavior, single bit Interrupt Request 234 and Interrupt Enable 236 registers have been provided for both the Master and Slave devices. The Interrupt Enables are controlled through the Device Control register of the respective device. Each device may assert the interrupt request to the host system to transfer data or to return completion status. In the current invention, the interrupt request may be set or cleared by the local processor. The interrupt request is also cleared by reading the Status register (but not the Alternate Status register) of the device as described in the protocols of the ATA Specification. The Interrupt Request and Interrupt Enable status for the Master and Slave devices is maintained independently so that the proper behavior may be attained when the host changes the device selection.

The Command and Control register files for Master and Slave devices as well as the Slave, Busy, and Interrupt "side effects" are all replicated for the secondary channel. The Command and Control register file blocks for all four devices are all mapped linearly in the Local Processor's address space.

The shared dual channel Bus Master Control block 250 may be accessed by either from the PCI Bus, or by the Local Processor.

According to the ATA protocol, a device is selected, all of parameters required for a given command are loaded into the Command register file followed by the command itself into the register at offset seven. As mentioned above, this will set the Channel Busy. The rising edge of Busy causes an interrupt to the Local Processor that will respond by interpreting the command and its parameters. Most commands will be remapped into accesses of the attached physical device array. These accesses can be used to implement any of the common RAID protocols, including, without limitation, RAID levels 0, 1, 3 and 5. The Local Processor has the option of reading more data than was requested. The additional data is cached in the SDRAM in anticipation of subsequent reads. The Local Processor may arrange to transfer data between the SDRAM and the host system using either programmed IO or DMA as requested by the command.

To briefly summarize, the present invention includes a RAID storage device controller that provides a host interface for interfacing the controller to a host system bus. The host interface is isolated from the attached storage devices, for example IDE disk drives, so that the actual attached drives are not limited in number or interface protocol. Various device ports can be implemented, and various RAID strategies, e.g. level 3 and level 5, can be used. In all the cases, the host interface provides a standard, uniform interface to the host, namely an ATA interface, and preferably a dual channel ATA interface. The host interface emulates the ATA single or dual channel interface and emulates one or two attached IDE devices per channel, regardless of the actual number of devices physically connected to the controller. Thus, for example, five or seven IDE drives can be deployed in RAID level 5 protocol without changing the standard BIOS in a PCI host machine. Thus the RAID controller is transparent relative to a standard dual channel ATA controller board.

It will be obvious to those having skill in the art that many changes may be made to the details of the above-described embodiment of this invention without departing from the underlying principles thereof. The scope of the present invention should, therefore, be determined only by the following claims.

What is claimed is:

1. A storage device controller for use in or coupled to a host system having a standard software driver for an IDE controller, the controller comprising:

a host interface for interfacing the controller to a host system bus;

emulation means in the controller and coupled to the host interface for emulating a standard IDE channel and also emulating at least one IDE device as though it were connected to the IDE channel;

at least one physical interface for connecting the storage device controller to at least two physical storage devices; and RAID implementation means disposed in the controller, coupled to the host interface, the emulation means, and the one or more physical interfaces for implementing RAID functionality on at least two physical storage devices when the physical storage devices are attached to the one or more physical interfaces, so as to transparently enable RAID functionality on at least two physical storage devices while presenting a standard IDE drive attached to a standard IDE interface to the host system at the host interface, thereby obviating any modification to the standard software driver in the host system.

2. A storage device controller according to claim 1 wherein at least one of the physical interfaces implements an ATA port for connecting an ATA-compatible physical storage device to the controller.

3. A storage device controller according to claim 1 wherein the emulation means emulates at least a primary IDE channel and a secondary IDE channel.

4. A storage device controller according to claim 3 wherein the emulation means emulates a single IDE device attached to each of the primary and secondary IDE channels.

5. A storage device controller according to claim 3 wherein the emulation means emulates both a master IDE storage device and a slave IDE storage device, attached to one of the primary and secondary IDE channels.

6. A storage device controller according to claim 3 and further comprising means for emulating a bus master DMA controller of a standard dual ported IDE controller.

7. A storage device controller according to claim 1 wherein the emulation means emulates a single IDE device attached to the IDE channel.

8. A storage device controller according to claim 1 wherein the emulation means emulates both a master IDE storage device and a slave IDE storage device attached to the IDE channel.

9. A storage device controller according to claim 1 and further comprising means for emulating a bus master DMA controller of a standard dual ported IDE controller.

10. A storage device controller according to claim 1 including at least two physical interfaces, each physical interface suitable for connecting at least one physical storage device to the storage device controller, and wherein the emulation means emulates a single IDE device as though it were connected to the IDE channel, thereby implementing one-to-many IDE emulation at the host interface.

11. A storage device controller according to claim 1 wherein at least one of the physical interfaces comprises a SCSI interface for connecting a plurality of physical storage devices to the controller, and wherein the emulation means emulates a single IDE device as though it were connected to the IDE channel, thereby implementing one-to many IDE emulation at the host interface.

\* \* \* \* \*